(12) United States Patent
Capstran

(10) Patent No.: US 6,599,063 B1
(45) Date of Patent: Jul. 29, 2003

(54) HOLE SAW HAVING EFFICIENT SLUG REMOVAL

(76) Inventor: Richard E. Capstran, 1741 Alta Vista Ave., Milwaukee, WI (US) 53213

( * ) Notice: Subject to any disclaimer, the term of this patent is extended or adjusted under 35 U.S.C. 154(b) by 0 days.

(21) Appl. No.: 10/232,642

(22) Filed: Aug. 31, 2002

(51) Int. Cl.[7] .......................... B23B 35/00; B23B 51/04
(52) U.S. Cl. ...................... 408/1 R; 408/68; 408/204; 408/206
(58) Field of Search ................. 408/1 R, 68, 204, 408/206, 207, 209, 703; 175/403, 405.1

(56) References Cited

U.S. PATENT DOCUMENTS

| | | | | |
|---|---|---|---|---|
| 2,779,361 A | * | 1/1957 | McKiff | 408/204 |
| 2,794,469 A | * | 6/1957 | Shortell | 408/206 |
| 3,262,474 A | * | 7/1966 | Enders | 408/209 |
| 3,265,104 A | * | 8/1966 | Gallo, Sr. | 408/68 |
| 3,382,743 A | * | 5/1968 | Trevathan | 408/145 |
| 3,390,596 A | * | 7/1968 | Trevathan | 408/68 |
| 3,609,056 A | * | 9/1971 | Hougen | 408/204 |
| 3,648,508 A | * | 3/1972 | Hougen | 72/325 |
| 4,406,334 A | * | 9/1983 | Baumann et al. | 175/315 |
| 4,652,185 A | | 3/1987 | Malrick | 408/68 |
| 4,693,644 A | * | 9/1987 | Takahashi | 408/204 |
| 5,435,672 A | | 7/1995 | Hall et al. | 408/68 |
| 5,628,376 A | * | 5/1997 | Kleine | 175/403 |
| 5,651,646 A | | 7/1997 | Banke et al. | 408/204 |
| 5,813,802 A | * | 9/1998 | Ajimi et al. | 408/68 |
| 5,934,845 A | * | 8/1999 | Frey | 408/68 |
| 6,206,616 B1 | | 3/2001 | Smith et al. | 408/1 |
| 2002/0106254 A1 | * | 8/2002 | Rudolph | 408/204 |

FOREIGN PATENT DOCUMENTS

| | | | | |
|---|---|---|---|---|
| DE | 282475 | * | 3/1915 | 408/204 |
| DE | 263477 A | * | 1/1989 | 408/204 |
| DE | 280057 A | * | 6/1990 | 408/204 |
| JP | 4-141309 A | * | 5/1992 | 408/204 |
| JP | 11-179720 A | * | 7/1999 | 408/204 |

* cited by examiner

*Primary Examiner*—Daniel W. Howell
(74) *Attorney, Agent, or Firm*—Donald J. Ersler

(57) ABSTRACT

A hole saw having efficient slug removal includes a saw cup, a shank portion, and a location drill. A plurality of cutting teeth are formed on an open end of the saw cup and the shank portion is attached to the other end of the saw cup. The location drill is retained in the shank portion. At least two inward cutting teeth are formed on an inside surface of the saw cup. The at least two inward cutting teeth may be two existing cutting teeth bent/formed inward, or at least two inward cutting teeth formed on an inside surface of the saw cup. The location drill is preferably modified such that the cutting diameter has a short length and the remainder of the length is relieved. A compression spring may be added to the hole saw to eject a slug.

7 Claims, 3 Drawing Sheets

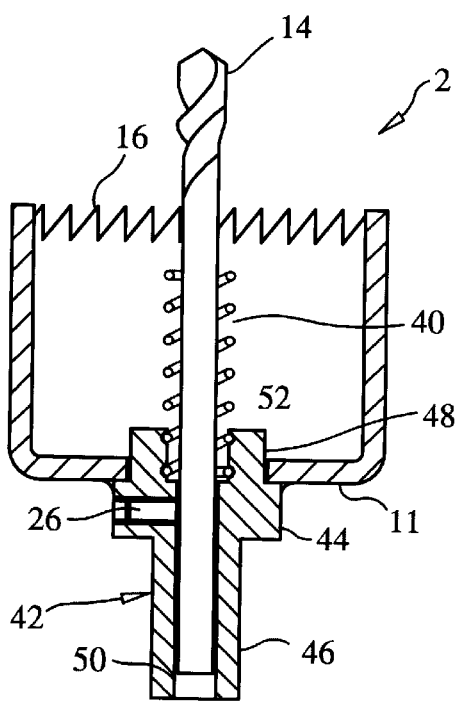
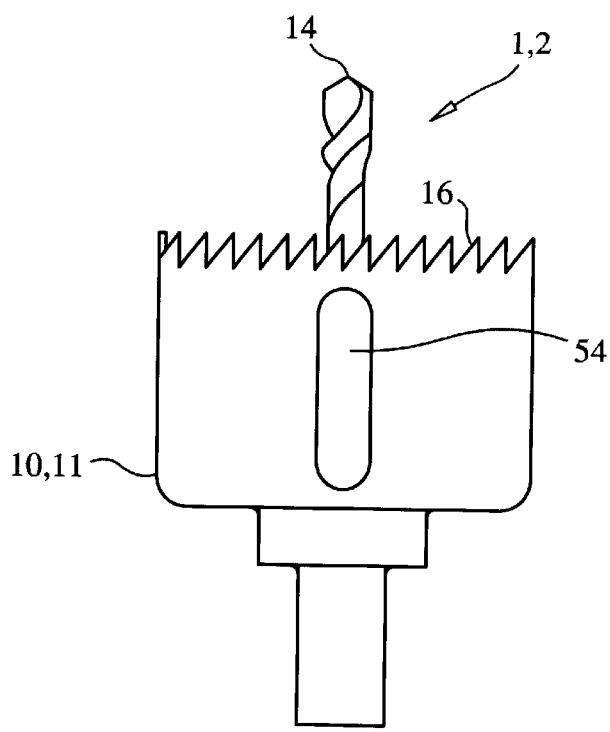
Fig. 7
Fig. 8
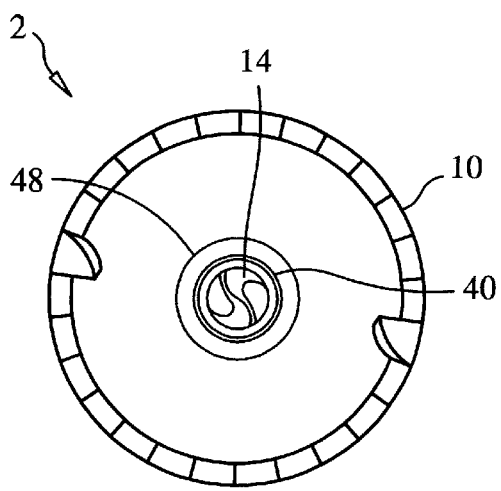
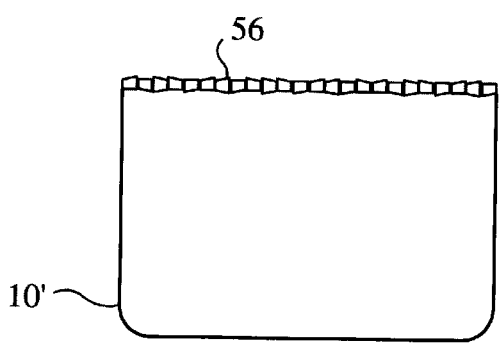
Fig. 9
Fig. 10

HOLE SAW HAVING EFFICIENT SLUG REMOVAL

BACKGROUND OF THE INVENTION

1. Field of the Invention

The present invention relates generally to hole saws and more specifically to a hole saw having efficient slug removal that allows a slug to be removed from the hole saw without the use of tools.

2. Discussion of the Prior Art

The most common type of hole saw is a cup with teeth formed on the open end, a shank attached to the other end of the cup, and a drill retained in the shank. The drill starts the hole cutting process by providing a pivotal anchor for cutting the hole with the cup. However, an aggravating problem encountered with hole saws is the removal of the slug from the cup. Depending upon the material of the slug, removal of the slug can be a major challenge. If the material is plastic, the plastic slug will heat bond to the inside surface of the cup. There are numerous solutions proposed for removal of the slug. The simplest method of slug removal is to form openings in the top and/or side of the hole saw to allow the slug to be pushed or pried out with a tool.

U.S. Pat. No. 4,652,185 to Malrick discloses hole saws. A spring loaded washer is used to push the slug out of the hole saw. However, if the material is plastic, hand pressure may not be sufficient to push the plastic slug out of the hole saw. U.S. Pat. No. 5,435,672 to Hall et. al discloses a hole saw having plug ejection feature. The hole saw having plug ejection feature includes a screw arbor, which is rotated to eject a slug therefrom. However, this design of hole saw is more complicated than the most common hole saw and requires the screw arbor to be rotated to remove the slug. U.S. Pat. No. 6,206,616 to Smith et al. discloses a tool and method for cutting a circular opening and retaining the cut portion.

Accordingly, there is a clearly felt need in the art for a hole saw having efficient slug removal that includes at least two modified teeth that reduces the size of the slug and a relieved drill that allows the reduced slug to fall out of the hole saw.

SUMMARY OF THE INVENTION

The present invention provides a hole saw having efficient slug removal that allows a slug to removed therefrom without a tool. The hole saw having efficient slug removal includes a saw cup, a shank portion, and a location drill. A plurality of cutting teeth are formed on an open end of the saw cup and the shank portion is attached to the other end of the saw cup with any suitable fastening process. An opening is formed through the shank to receive the location drill. Preferably, a set screw or the like is used to retain the location drill in the shank portion. The saw cup is modified such that at least two cutting teeth protrude inward. The at least two inward cutting teeth may be two existing cutting teeth bent inward, or at least two inward cutting teeth attached to an inside surface of the saw cup. The at least two inward cutting teeth are preferably located substantially equidistant from each other about the circumference of the open end. The at least two inward cutting teeth create a slug which will fall out of the saw cup.

The location drill is modified such that a cutting diameter has a short length and the remainder of the length is relieved, such that the remainder of the length is smaller in diameter than the cutting diameter. When the hole saw is turned such that the open end is facing downward, the slug drops until it contacts a bottom cutting diameter edge of the location drill. The slug may be removed from the drill by hand. A compression spring may be added to the hole saw to eject the slug when the open end of the saw cup is facing upward. A bottom of the compression spring is attached to a top of the saw cup, on an inside surface of the top.

Accordingly, it is an object of the present invention to provide a hole saw having efficient slug removal that reduces the size of the slug.

It is a further object of the present invention to provide a hole saw having efficient slug removal that includes a relieved drill that allows the reduced slug to fall out of the hole saw.

Finally, it is another object of the present invention to provide a hole saw having efficient slug removal that includes a compression spring that ejects a slug when the open end of the saw cup is facing upward.

These and additional objects, advantages, features and benefits of the present invention will become apparent from the following specification.

BRIEF DESCRIPTION OF THE DRAWINGS

FIG. 7 is a cross sectional view of a hole saw having efficient slug removal with a compression spring in accordance with the present invention.

FIG. 8 is a side view of a hole saw having efficient slug removal with at least one removal slot in accordance with the present invention.

FIG. 9 is a top view of a hole saw having efficient slug removal with a compression spring in accordance with the present invention.

FIG. 10 is a side view of a saw cup having cutting teeth replaced with an abrasive cutting surface in accordance with the present invention.

DETAILED DESCRIPTION OF THE PREFERRED EMBODIMENTS

Figure 1:
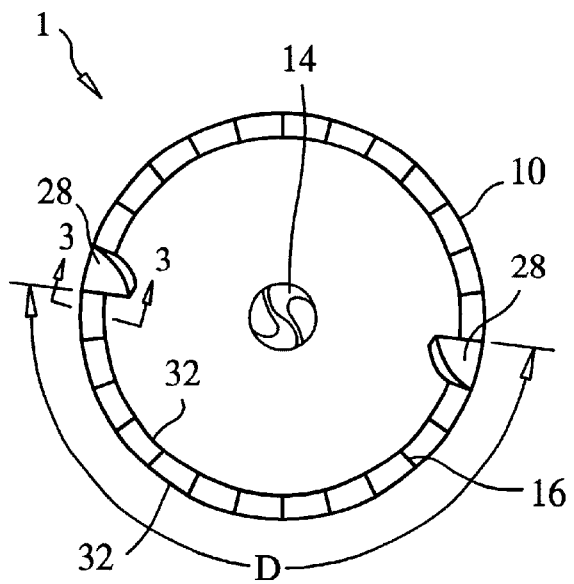
FIG. 1 is a bottom view of a hole saw having efficient slug removal in accordance with the present invention.
Figure 2:
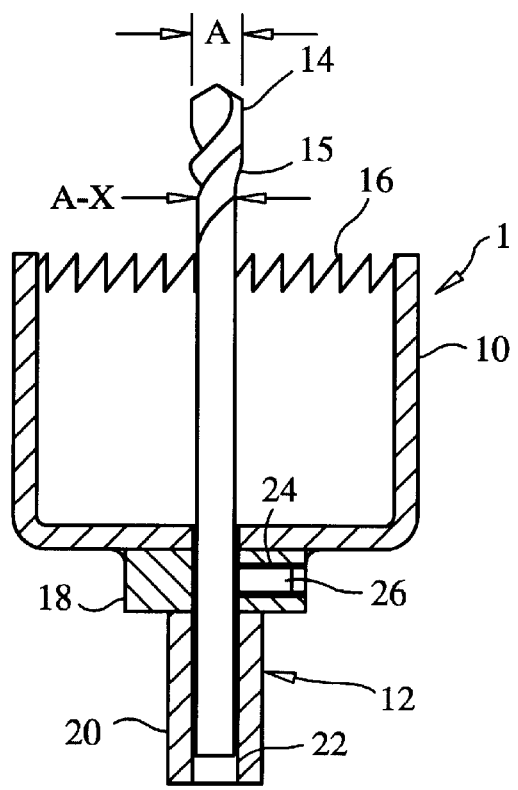
FIG. 2 is a cross sectional view of a hole saw having efficient slug removal in accordance with the present invention.

With reference now to the drawings, and particularly to FIG. 1, there is shown a top view of a hole saw having efficient slug removal 1. With reference to FIG. 2, the hole saw having efficient slug removal 1 includes a saw cup 10, a shank portion 12 and a location drill 14. The shank portion 12 is attached to a closed end of the saw cup 10 with any suitable fastening process, such as welding. The shank portion 12 preferably includes a fastening portion 18 and a chuck shank 20. A drill opening 22 is formed through the fastening portion 18 and the chuck shank 20 to receive the location drill 14. A female thread 24 is preferably formed through the fastening portion 18 to the drill opening 22. A threaded fastener 26 (such as a set screw) is tightened against the location drill 14 to retain thereof relative to the saw cup 10. However, other designs of shank portions may also be used.

Figure 3:
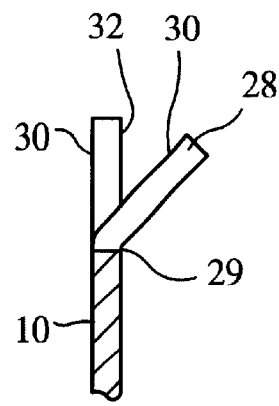
FIG. 3 is an enlarged end view of a single cutting tooth bent inward of a hole saw having efficient slug removal in accordance with the present invention.

A plurality of cutting teeth 16 are formed on an open end of the saw cup 10. The saw cup 10 is modified such that at least two cutting teeth 28 protrude inward toward a center of the saw cup. The saw cup 10 includes an outside surface 30 and an inside surface 32. With reference to FIG. 3, the at least two inward cutting teeth 28 may be two existing cutting teeth 16 bent or formed inward. An axis of bending 29 is preferably disposed at substantially a bottom of each inward cutting tooth 28, but other locations may also be used. However, the more inward cutting teeth 28, the easier it is for the slug to be removed. For example, the inventor bent 8 cutting teeth 16 inward and found that the slug was easier to remove than when 2, 3, or 4 cutting teeth 16 were bent inward.

Figure 3A:
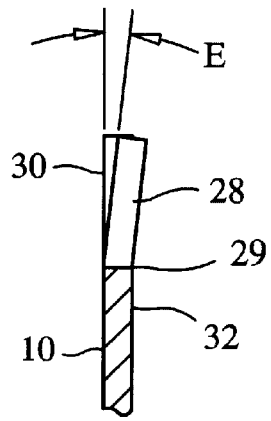
FIG. 3a is an enlarged end view of a single cutting tooth bent slightly inward of a saw cup in accordance with the present invention.

With reference to FIG. 3a, the at least two inward cutting teeth 28 are bent or formed inward to an angle "E." It is preferable that angle "E" have a value of at least one degree. The at least two inward cutting teeth 28 are preferably located substantially equidistant from each other. For example, angle "D" is preferably 180 degrees. The at least two inward cutting teeth 28 create a slug which will fall out of the saw cup 10. The slug is the same diameter as the inward tip of the at least two inward cutting teeth 28. The only resistance to removal of the slug is point contact from the inward tips of the at least two inward cutting teeth 28. A larger diameter hole saw will require more inward cutting teeth 28 than a smaller diameter hole saw.

Figure 4:
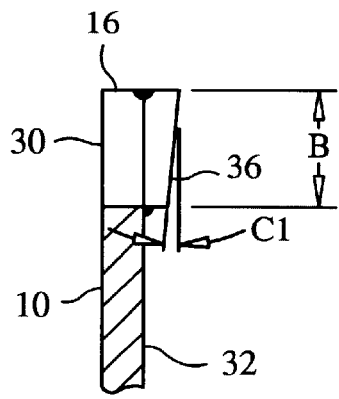
FIG. 4 is an enlarged side view of an inward cutting tooth of a hole saw having efficient slug removal in accordance with the present invention.
Figure 4A:
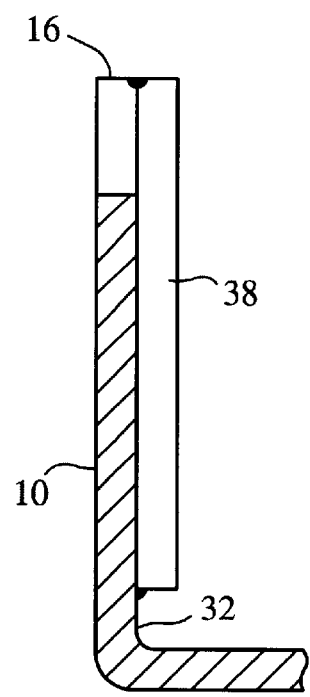
FIG. 4a is an enlarged side view of an inward cutting tooth that extends substantially the depth of the saw cup of a hole saw having efficient slug removal in accordance with the present invention.
Figure 5:
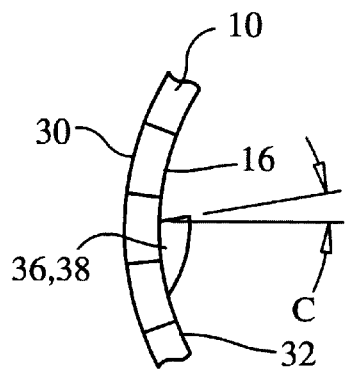
FIG. 5 is an enlarged top view of an inward cutting tooth of a hole saw having efficient slug removal in accordance with the present invention.

With reference to FIGS. 4–5, the saw cup 10 may also be modified by forming at least two inward cutting teeth 36 on an inside surface of the hole saw 10. The height "B" of the at least two inward cutting teeth 36 is preferably the same as the height of the cutting teeth 16. The length of each inward cutting tooth 36 is preferably relieved from a top of a cutting edge with an angle "C1" to improve cutting and removal of a slug. A single inward cutting tooth 38 may be used, but the height thereof must be substantially the depth of the saw cup 10. The inward cutting teeth 36, 38 may include a positive or negative rake "C" for cutting different types materials.

Figure 6:
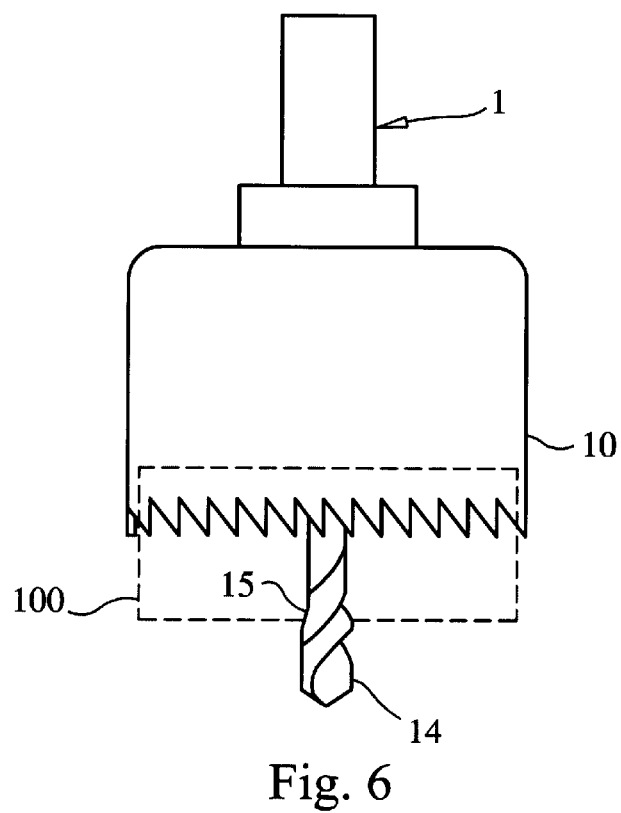
FIG. 6 is a side view of a hole saw having efficient slug removal with a slug contacting a cutting diameter edge of a location drill in accordance with the present invention.

The location drill 14 is preferably modified such that the cutting diameter "A" has a short length and the remainder of the length is relieved, such that the remainder of the length has a diameter "A-X," which is smaller in diameter than the cutting diameter "A." The value of "X" is preferably at least 0.015 inches. Preferably, the transition from the cutting diameter "A" to the relieved diameter "A-X" is implemented with a straight taper of 10 degrees from the axis of the drill. However, other values and transition shapes besides the 10 degree straight taper may also be used. With reference to FIG. 6, when the hole saw 1 is oriented such that the open end of the saw cup 10 is facing downward, a slug 100 drops until thereof contacts a bottom of the cutting diameter edge 15 of the location drill 14. The slug 100 may be removed from the location drill 14 by hand. Sometimes the slug will fall off the location drill 14. For some materials and hole saw sizes, a relieved location drill 14 is not necessary to aid removal of a slug 100; the slug 100 will drop off the location drill 14.

With reference to FIGS. 7 and 9, a compression spring 40 is added to the hole saw 2 to eject a slug, when the open end is facing upward. The compression spring 40 may be retained by creating a spring shank portion 42. The spring shank portion 42 includes a fastening portion 44, a chuck shank 46, and a spring retainer 48. A drill opening 50 is formed through the fastening portion 44 and the chuck shank 46 to receive the location drill 14. Preferably, a threaded fastener 26 (such as a set screw) is tightened against the location drill 14 to retain thereof relative to the saw cup 11. A clearance hole is formed through a top of the saw cup 11 to receive the spring retainer 48. A spring tap 52 is formed in the spring retainer 48 to threadably receive the compression spring 40. Preferably, the compression spring 40 is wound in a direction opposite the rotation of the hole saw 2, such that rotation of the hole saw 2 causes the compression spring 40 to thread into the spring tap 52. However, other methods of retaining a bottom of the compression spring 40 against a top of the saw cup 10 may also be used, such as welding, adhesive, or retention tabs on the saw cup 10, which capture a bottom of the compression spring 40.

At least one removal slot 54 may be formed in a side and/or top of the saw cup 10, 11 to provide clearance for a tool (such as a screw driver), which would be used to help remove a slug from the saw cup 10, if the need should arise. Other openings in the side and top of the saw cup 10, 11 may also be formed for helping the removal of an occasional stuck slug.

FIG. 10 shows that the cutting teeth 16 have been replaced with an abrasive cutting surface 56 on the saw cup 10'. Other suitable cutting surfaces may also be used besides the cutting teeth 16 and the abrasive cutting surface 56. At least one inward cutting tooth 36, 38 may be formed on an inside surface of the saw cup 10' as shown in FIGS. 4–5.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of providing efficient slug removal from a hole saw comprising the steps of:

providing a saw cup having a plurality of cutting teeth formed on an open end thereof;

bending at least two cutting teeth inward such that some portion of an outside circumference of said at least two cutting teeth forms an outer circumference that is less than an inner circumference of said saw cup, none of said plurality of cutting teeth being bent outward such that some portion of an inner circumference thereof exceeds an outer circumference of said saw cup;

forming a shank portion on a closed end of said saw cup; and providing a location drill which is retained in said shank portion.

2. The method of providing efficient slug removal from a hole saw of claim 1, further comprising the step of:

locating said at least two inward cutting teeth equidistant from each other.

3. The method of providing efficient slug removal from a hole saw of claim 1, further comprising the step of:

relieving a portion of said location drill below a cutting diameter thereof.

4. The method of providing efficient slug removal from a hole saw of claim 1, further comprising the step of:

retaining a bottom of a compression spring on a top of said saw cup.

5. A method of providing efficient slug removal from a hole saw comprising the steps of:

providing a saw cup having a plurality of cutting teeth formed on an open end thereof;

bending at least two cutting teeth inward such that some portion of an outside circumference of said at least two cutting teeth forms an outer circumference that is less than an inner circumference of said saw cup, none of said plurality of cutting teeth being bent outward such that some portion of an inner circumference thereof exceeds an outer circumference of said saw cup;

forming a shank portion on a closed end of said saw cup; and providing a location drill which is retained in said shank portion, relieving a portion of said location drill below a cutting diameter thereof.

6. The method of providing efficient slug removal from a hole saw of claim 5, further comprising the step of:

locating said at least two inward cutting teeth equidistant from each other.

7. The method of providing efficient slug removal from a hole saw of claim 5, further comprising the step of:

retaining a bottom of a compression spring on a top of said saw cup.

\* \* \* \* \*